US008520675B1

(12) United States Patent
Frailong et al.

(10) Patent No.: US 8,520,675 B1
(45) Date of Patent: Aug. 27, 2013

(54) SYSTEM AND METHOD FOR EFFICIENT PACKET REPLICATION

(75) Inventors: Jean-Marc Frailong, Los Altos, CA (US); Jeffrey G. Libby, Cupertino, CA (US); Anurag P. Gupta, Saratoga, CA (US); John Keen, Mountain View, CA (US); Rajesh Nair, Fremont, CA (US); Avanindra Godbole, San Jose, CA (US); Sharada Yeluri, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 735 days.

(21) Appl. No.: 12/343,276

(22) Filed: Dec. 23, 2008

(51) Int. Cl.
*H04L 12/28* (2006.01)
*H04L 12/56* (2006.01)

(52) U.S. Cl.
USPC ........ 370/390; 370/230.1; 370/266; 370/270; 370/239; 370/391; 370/392; 370/401; 370/432

(58) Field of Classification Search
USPC ......................................... 370/390; 390/432
See application file for complete search history.

(56) References Cited

U.S. PATENT DOCUMENTS

| | | | | |
|---|---|---|---|---|
| 5,898,687 A * | 4/1999 | Harriman et al. | ............. | 370/390 |
| 7,263,099 B1 * | 8/2007 | Woo et al. | ...................... | 370/390 |
| 7,289,503 B1 * | 10/2007 | Sindhu et al. | ................. | 370/392 |
| 7,298,738 B1 * | 11/2007 | Parruck et al. | ................ | 370/360 |
| 7,330,468 B1 * | 2/2008 | Tse-Au | .......................... | 370/389 |
| 7,420,972 B1 * | 9/2008 | Woo et al. | ...................... | 370/390 |
| 7,623,455 B2 * | 11/2009 | Hilla et al. | .................... | 370/232 |
| 7,715,419 B2 * | 5/2010 | Tatar et al. | .................... | 370/419 |
| 2005/0147095 A1 * | 7/2005 | Guerrero et al. | .............. | 370/390 |

* cited by examiner

*Primary Examiner* — Jae Y Lee
(74) *Attorney, Agent, or Firm* — Harrity & Harrity, LLP

(57) ABSTRACT

Methods and systems consistent with the present invention provide efficient packet replication in a router in order to multicast a stream of data. Packets are replicated and processed in a multithreaded environment. Embodiments consistent with the present invention implement a two-stage process for packet replication. The first stage thread will recirculate the packet to multiple second-stage threads. These second-stage threads will then create one or more outgoing copies of the packet. In this way, the copies are handled by multiple threads running in parallel.

20 Claims, 6 Drawing Sheets

SYSTEM AND METHOD FOR EFFICIENT PACKET REPLICATION

FIELD OF THE INVENTION

The present invention generally relates to packet multicast, and relates more particularly to packet replication for a multicast session.

BACKGROUND

Broadband access technologies, such as cable modems and digital subscriber lines (DSLs), enable service providers to distribute multimedia content over data networks. Some of the applications offered by service providers, such as broadband video and interactive gaming, require multicast distribution of content from a source (the service provider, generally connected to a backbone network) to multiple destinations (end users, generally connected through an access network). For these applications, several hundreds of end users may be served, and so the content must be delivered at low cost to the network. Cost may be measured in a number of ways, such as node delay/congestion, processing/memory requirements, or complexity.

Because access packet networks support many broadband technologies, the multicast distribution of content requires efficient support of multicast connections in switches and routers that receive the content and transfer the content to the access packet network. For example, a router in a network may receive broadcast video from a satellite, and then multicast this content to a number of users connected to the network. These switches and routers are sometimes referred to as edge switches and edge routers. For the following description, the term "router" is used, but the description applies equally to switches.

In a computer network, data is transmitted between users as formatted blocks of information called "packets." For a multicast connection to two or more end users, a multicast session comprises a stream of packets (or "packet flow"). The packet flow from the content provider is received at an ingress port of the edge router. To generate a packet flow from the edge router to each end user that is to receive the multicast content, the edge router duplicates each packet of the packet flow. Each multicast packet is separately addressed for a corresponding egress port. A packet processor replicates the packet into multicast packets, queues each multicast packet, and delivers each multicast packet to a corresponding egress port.

Replicating packets, either through pointer manipulation or actual copying, is an expensive process in terms of processing cycles and/or memory bandwidth used. Typically, this process was performed in network processors by a single thread in a packet processing engine (PPE). Packet processing engines analyze packet headers to determine the next hop for the packet, and configure the packet headers to send them there. Multiple threads in a PPE were not historically used for processing a single packet because a) the threads operate concurrently and there may not be an efficient means to do packet communication between the threads; and b) even when there is a packet communication path, packet replication has specific ordering requirements which forces multiple threads to do the multiplication in a serial manner (which defeats the purpose of having multiple threads do the processing). Because there is an application requirement that packets within the same flow should exit a device in the same order, there needs to be a scheme to maintain packet order while achieving true parallel processing of the packets.

SUMMARY

Systems and methods consistent with the present invention provide concurrent packet replication using a plurality of threads among a plurality of packet processing engines to achieve faster and more efficient packet replication. Unlike conventional packet replication schemes, embodiments consistent with the present invention include two stage packet processing in which replicated packets are assigned a flow ID for identifying packet groupings and recirculated for second stage processing so that threads may work in parallel to process packets having different flow IDs without waiting on each other. Furthermore, embodiments consistent with the present invention include a component that maintains ordering requirements of packets using the flow IDs. Flow IDs may assigned based on the destination of the packet (or other fields). Accordingly, packets going to the same destination are processed in the same order, while packets without such an ordering requirement are not. This scheme allows for more efficient use of the processor resources, thus allowing greater bandwidth in a multicast or tunneling virtual private network (VPN) scenario.

Methods and systems consistent with the present invention are directed to a network device for replicating packets in a network, wherein a stream of packets are received at the network device and replicated to produce a plurality of outbound packet flows that are multicasted to a plurality of subscribers in the network. The network device comprises a plurality of packet processing engines to process packets received by the network device, a dispatch block configured to dispatch packets among the plurality of packet processing engines, and a recirculate path through which a packet processing engine returns a packet for replication. Each of the plurality of packet processing engines executes a plurality of threads that perform packet processing. The network device further includes reorder block in the recirculate path between the plurality of packet processing engines and the dispatch block, wherein the reorder block maintains the order of packets in packet flows. The order of packet flows is maintained by a plurality of queues, wherein each of the plurality of queues has a flow ID corresponding to a flow ID of one of plurality of packet flows. The flow ID is calculated by calculating a hash of a source address and destination address of a packet in a packet flow. From a given source, packets with the same destination have identical flow IDs. The dispatch block, plurality of packet processing engines, and recirculate path are part of a lookup unit of a router, which may be implemented as an application specific integrated circuit (ASIC). The dispatch block may maintain an incoming packet queue for each of a plurality of ports in the router, and may process a recirculated packet before a new incoming packet.

In another embodiment, methods and systems consistent with the present invention are directed to a method in a data processing system for packet replication, the system including a dispatch block, a plurality of packet processing engines each executing a plurality of threads for packet processing, and a reorder block. The method comprises the steps of receiving a first packet at the dispatch block, dispatching the first packet to one of the plurality of threads, determining that the first packet is to be replicated, returning the first packet to the dispatch block, dispatching a plurality of replicated packets to a plurality of threads for concurrent processing, and processing the plurality of replicated packets. The method further comprises assigning a flow ID to each of the plurality of replicated packets. Assigning a flow ID may include calculating the hash of a source address and destination address of each of the plurality of replicated packets. Processing the replicated packets may include processing replicated packets having the same flow ID in order. The method may further include maintaining a queue in the reorder block for each flow ID assigned, wherein returning the first packet to the dispatch block includes returning the first packet to the dispatch block via the reorder block. Determining that the first packet is to be replicated includes examining a header for the first packet. The method may further include receiving a multicast list with the first packet, and determining destination addresses for replicated packets using the multicast list.

Yet another embodiment consistent with methods and systems consistent with the present invention is directed to a computer-readable medium storing computer executable instructions for performing a method of packet replication in a network device, the network device including a dispatch block, a plurality of packet processing engines each executing a plurality of threads for packet processing, and a reorder block. The method comprises the steps of receiving a first packet at the dispatch block, dispatching the first packet to one of the plurality of threads, determining that the first packet should be replicated, returning the first packet to the dispatch block, dispatching a plurality of replicated packets to a plurality of threads for concurrent processing, and processing the plurality of replicated packets.

Other systems, methods, features, and advantages consistent with the present invention will become apparent to one with skill in the art upon examination of the following figures and detailed description. It is intended that such additional systems, methods, features, and advantages be included within this description and be within the scope of the invention.

BRIEF DESCRIPTION OF THE DRAWINGS

The accompanying drawings, which are incorporated in and constitute a part of this specification, illustrate an implementation of methods and systems consistent with the present invention and, together with the description, serve to explain advantages and principles consistent with the invention. In the drawings.

DETAILED DESCRIPTION

Methods and systems consistent with the present invention achieve faster packet processing by processing packets among multiple threads running concurrently. Methods and systems consistent with the present invention may implement a recirculate path for concurrent threads to communicate packet data with one another. Further, embodiments consistent with the present invention have implemented a two-stage process for packet multiplication. Threads in the first stage recirculate packets to threads in the second stage. These second-stage threads then create or receive one or more outgoing copies of the packet. In this way, the copies are handled by multiple threads running in parallel. To deal with ordering requirements, router hardware exploits the fact that only packets to the same destination must be kept in order. Embodiments consistent with the present invention provide hardware support to ensure that this requirement is satisfied while not imposing the ordering constraint on packets going to different destinations. A special operation is implemented in microcode to assign a hash value (a flow ID) to all packets to the same destination. Therefore the second-stage processing happens in a serial manner for packets with the same flow ID, while packets with different flow IDs can get processed in parallel by the threads. The flow ID can be calculated multiple times as the packet continues processing, and each successive flow ID is reported to a reorder block. This scheme allows the flow ID to be refined in as many steps as deemed worthwhile to ensure that packets exit the device in the same order.

Reference will now be made in detail to an implementation consistent with the present invention as illustrated in the accompanying drawings.

Figure 1:
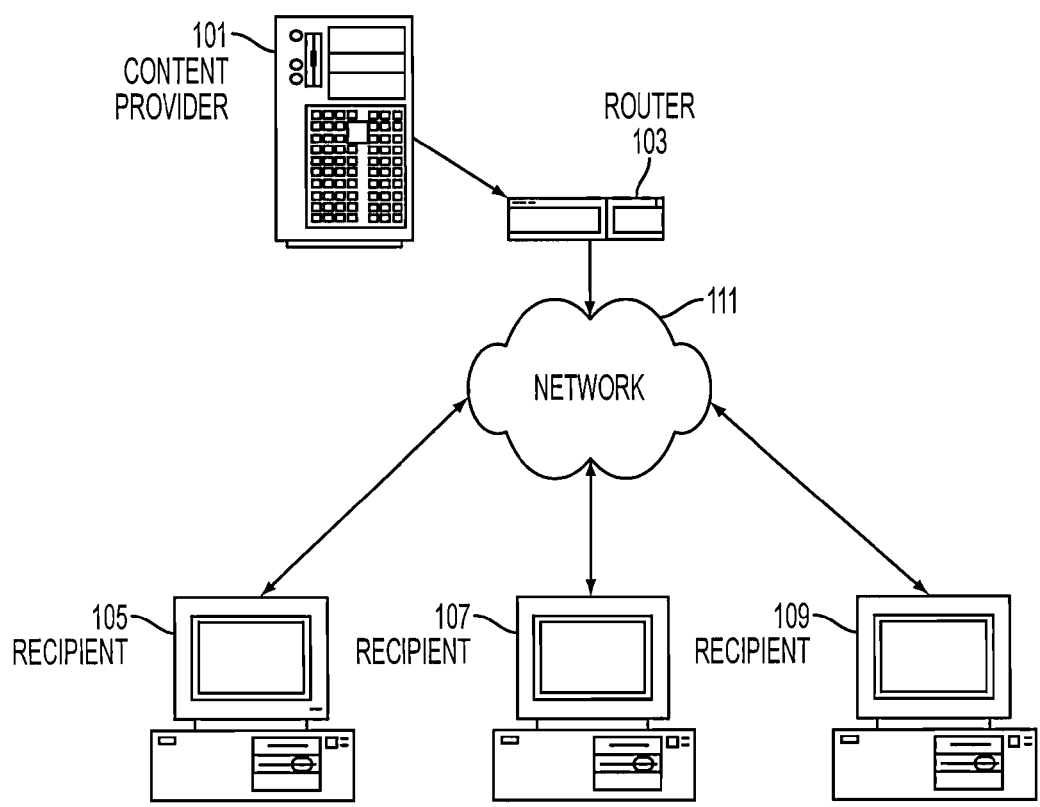
FIG. 1 illustrates an exemplary network environment consistent with the present invention.

FIG. 1 illustrates a network in which methods and systems consistent with the present invention may be implemented. A content provider 101 transmits a content stream including a multicast list to router 103. The content stream may be serialized packet data and the multicast list may be the list of recipients of that packet data. Router 103 replicates the packets and multicasts the packets to recipients 105, 107, and 109 via network 111. One of ordinary skill in the art will recognize that there may be any number of recipients.

Figure 2:
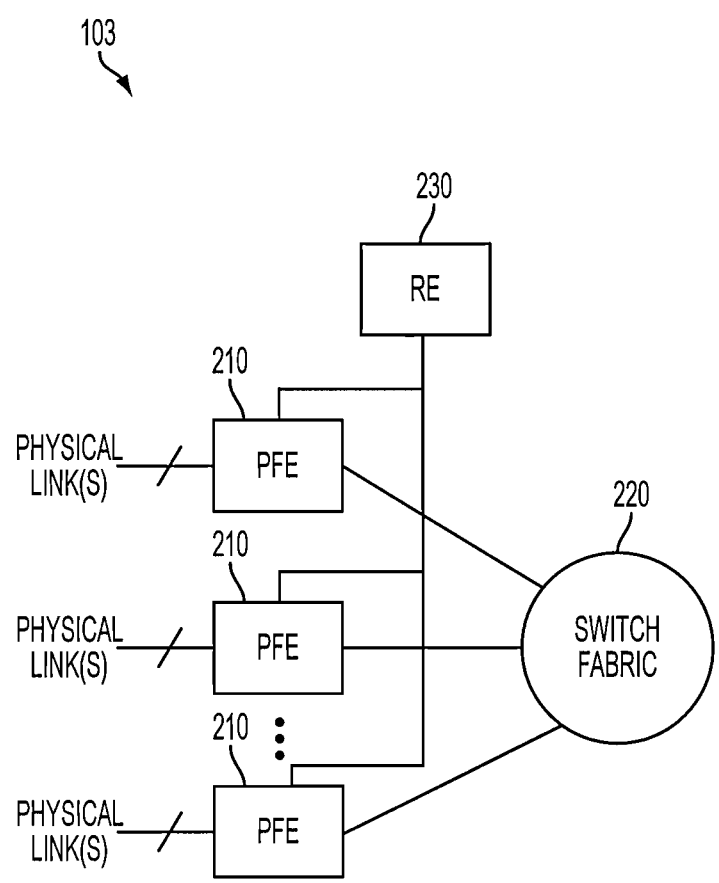
FIG. 2 illustrates an exemplary network device, such as a router.

Turning to FIG. 2, an exemplary network device, such as a router 103 is illustrated. Router 103 may receive data streams from physical links, process the data streams to determine destination information, and transmit the data streams out on links in accordance with the destination information. As shown in FIG. 2, router 103 may include packet forwarding engines (PFEs) 210, a switch fabric 220, and a routing engine (RE) 230.

PFEs 210 may each be connected to RE 230 and switch fabric 220. PFEs 210 may receive data units at ports on physical links connected to a network, such as a wide area network (WAN) or a local area network (LAN). Each physical link could be one of many types of transport media, such as optical fiber or Ethernet cable. The data on the physical link may be formatted according to one of several protocols, such as the synchronous optical network (SONET) standard or Ethernet.

PFEs 210 may, for each received data unit, process a header of the data unit to determine an appropriate output port for the data unit. PFEs 210 may modify the header of the received data units before transmitting the data unit to the determined output port. Some received data units may be forwarded to an output port connected to the PFE at which the data unit arrived. Other data units may be forwarded, via switch fabric 220, to other PFEs 210 in router 103 for transmission at the determined output port.

Switch fabric 220 may be a switching component designed to allow efficient communication between PFEs 210. For instance, switch fabric 220 may be a hardwired non-blocking minimal spanning switch capable of connecting N inputs to N outputs in any combination.

RE 230 may perform high level management functions for router 103. For example, RE 230 may communicate with other networks and network devices connected to router 103 to exchange information regarding network topology. RE 230 may create routing tables based on network topology information and forwarding tables based on the routing tables. The forwarding tables may be used by PFEs 210 to perform route lookup for incoming data units. RE 230 may also perform other general control and monitoring functions for router 103.

Router 103 illustrates one possible implementation of a network device that may maintain orderings for data units in a traffic flow and perform packet replication. In other implementations, network switching devices with other architectures or designs could also be used to perform the techniques described herein. In general, the term "router," as used herein, means either a switch or a router.

Figure 3:
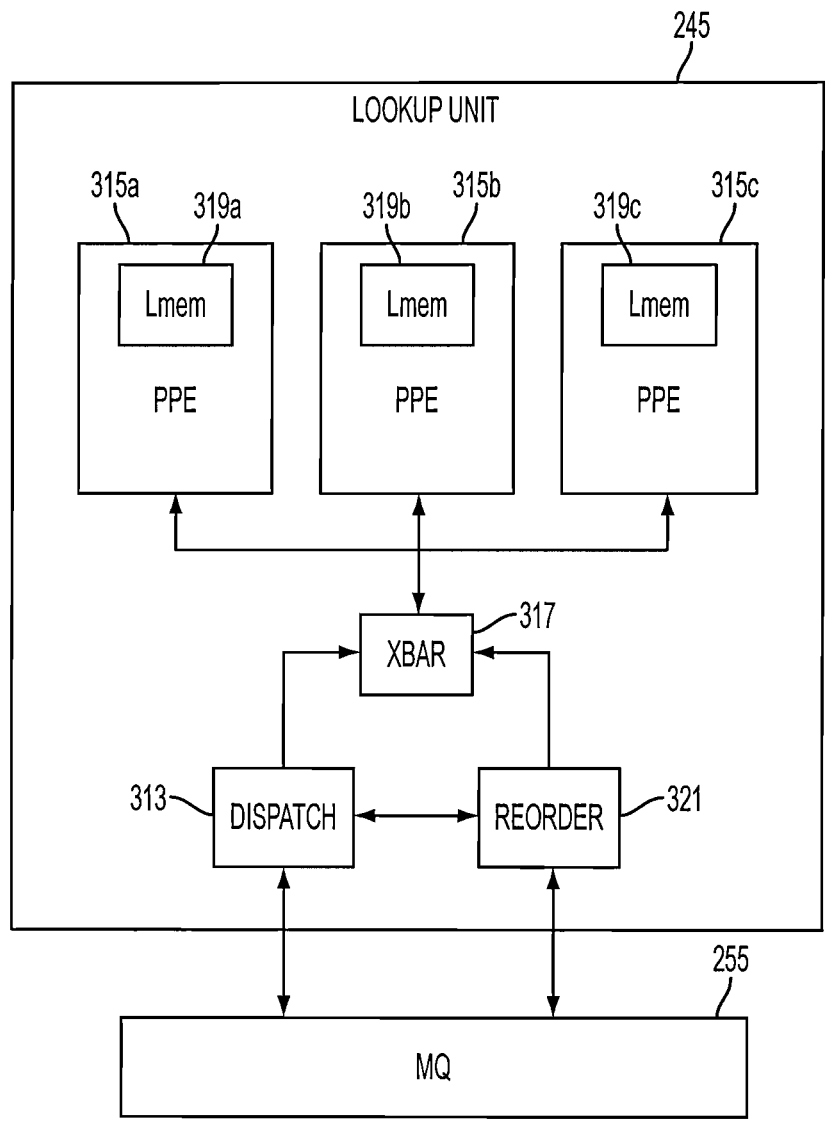
FIG. 3 illustrates an overhead view of a lookup unit consistent with the present invention.

FIG. 3 is a diagram conceptually illustrating exemplary components of router 103 related to processing and ordering of packets. The components shown in FIG. 3 may be implemented in each PFE 210. As shown, router 103 further includes a lookup unit (LU) 245 and a message queue (MQ) 255. The LU 245 and MQ 255 are described below. In one embodiment consistent with the present invention, the LU 245 is implemented in an application specific integrated circuit (ASIC).

FIG. 3 shows the top level block diagram of an LU 245 and an MQ 255 consistent with the present invention. LU 245 performs functions relating to packet header processing including input processing, route lookup, classification, filtering, policing, accounting, encapsulation, and statistics. The MQ 255 sends packet headers to the LU 245 and the LU sends back fully processed new headers to the MQ. The LU 245 maintains packet order for packets belonging to the same flow. Header processing is done by a collection of identical multi-threaded Packet Processing Engines (PPEs) 315a-c, described below. Headers come into the LU 245 via a Dispatch Block 313 and are sent to the PPEs 315a-c through crossbar block 317. The Dispatch Block 313 picks the least heavily loaded engine for each header. Once a PPE 315a-c is assigned, the header is moved to that PPE and stays within that PPE until processing on the header is completed. Each PPE 315a-c has its own local memory (LMem) 319a-c to hold the packet header and other states needed during processing. When a PPE 315a-c has finished processing a header, it notifies a Reorder Block 321. The Reorder Block 321 is responsible for maintaining order for headers belonging to the same flow, and pulls a header from a PPE 315a-c when that header is at the front of the queue for its reorder flow. The header may be sent to the MQ 255, or recirculated back to the Dispatch Block 313 for further processing, as described below.

The Dispatch Block

The Dispatch Block 313 assigns headers arriving from the MQ 255 to PPEs 315a-c for processing. For purposes of example and explanation, the following description presumes that the Dispatch Block assigns a header to PPE 315a. The total LMem 319a within the PPE 315a is partitioned into zones. For example, a 32 KB LMem space is split into 32 zones of 1 KB each. The Dispatch Block 313 picks one zone within the PPE 315a, and writes the header into the corresponding LMem 319a space. When header processing is completed, the Reorder Block 321 unloads the header from that LMem 319a space and indicates the zone can be retired to the Dispatch Block 313. Thus, the Dispatch Block 313 owns the zone assignment; it keeps track of in-use or active zones and deactivates a zone when it can be retired. Note that zones are different from contexts within the PPE 315a. A zone is a block of memory (for example, 1 KB in size) in which a packet header is loaded so the context can process it. A zone is dynamically bound to a context, rather than statically assigned a fixed binding at reset time, so that when a context is finished processing a packet in a first zone, it can bind itself to a second zone and begin processing another packet without waiting for Dispatch Block 313 to load the first zone again with a new packet. This scheme prevents the context from idling for too long. Each thread within the PPE 315a runs in a separate context that has its own private set of registers. The number of contexts C is smaller than the number of zones Z. The first 1 KB of each context is mapped dynamically to a new zone when the context is activated, and the binding is removed when the context is terminated. Context activation, termination, and the binding is handled by the PPE 315a (unlike zone activation and termination which is handled by the Dispatch Block 313). Since Z is larger than C, and only a small number of zones are reserved for read-only shared memory, there are several unbound zones.

The Packet Processing Engines

The PPEs 315a-c may be identical blocks that may operate independently of one-another. Code running on one PPE is oblivious of the presence of other PPEs 315a-c. This model makes for great simplicity, but it also means that it supports only a single model for header processing: a bunch of PPEs 315a-c operating in parallel. Each PPE 315a-c is C-way multi-threaded to mitigate the impact of memory latency on performance. Each thread runs in a separate context that has its own private set of general-purpose registers, local memory, stack pointer, program counter (PC), and a small number of other state bits. Just as there is no interaction between PPEs 315a-c, there is also no interaction between contexts in a PPE.

The Reorder Block

Headers are dispatched to multiple PPEs 315a-c working in parallel, and may finish their processing in a different order than they were dispatched. The Reorder Block 321 is responsible for putting the packet headers back in order, such that a later packet does not retire before an earlier packet in the same flow. The concept of flows is introduced to exploit the fact that ordering does not matter between unrelated packets. If some packets require a lot of processing, unrelated subsequent packets can complete processing and free up PPE 315a-c resources, improving the overall throughput of the pool of engines. In the extreme case, a flow could be simply the input-stream-number for the packet from the MQ 255, i.e., the physical port for a wide area network (WAN) or ingress packet forwarding engine (PFE) for fabric or the recirculate path. These per-stream flows can be further split using a flow ID (e.g., a hash value based on portions of the header) computed by the PPE 315a-c early during packet processing. In one embodiment, all in-flight packets between the Dispatch Block 313 and the Reorder Block 321 can be uniquely identified by a PPE-zone pair. Since the number of these packets is bounded and small, a queue of packets can be maintained in hardware as on-chip linked lists.

Figure 4:
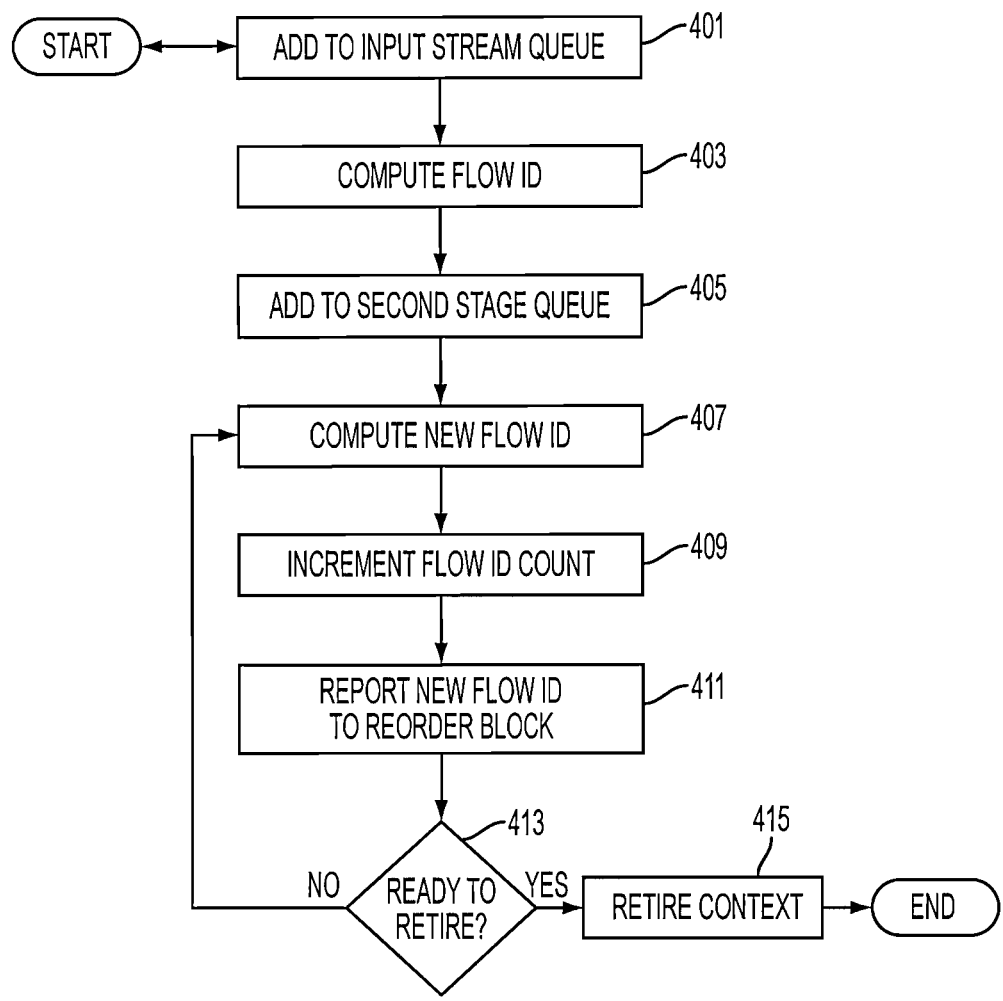
FIG. 4 illustrates a method of maintaining packet ordering requirements consistent with the present invention.

FIG. 4 illustrates a method for maintaining packet order consistent with the present invention. When a packet is dispatched, it is appended to the queue for that input-stream-number (step 401). When the flow ID for a packet is reported and it is at the head of the first queue, a new flow ID is computed (step 403), and the packet is appended to the queue for that flow ID, i.e., the second queue (step 405). The flow ID for a packet can be calculated based on one or more of a number of fields associated with a packet header, such as a source address, destination address, packet protocol, or other fields. As packet processing progresses, the flow ID is refined and recalculated when it reaches the head of a second queue (step 407). At the head of a second queue, the packet may be taken up for processing or returned to another second queue with the newly calculated flow ID. Only the packet at the head of any second queue is retired. Until the flow ID of a packet is computed, it can block other unrelated packets behind it for the same input-stream-number. Packets directed along the recirculate path to a specific PPE-zone pair, or from that PPE-zone, have separate queues, i.e., are identified as a unique flow ID that do not interact with the other flows. The separation enables efficient handling of the unbounded multicast replication as described below. The flow ID is a hash of limited information in the packet header and the input stream number. As the packet parsing progresses, more information is revealed and the flow ID can be refined. There is a trade-off between reporting the flow ID early based on limited packet parsing, and the resolution or accuracy of the flow ID. In an ideal case, one would want the flexibility of reporting the flow ID multiple times, as it gets refined, and have the reorder queues structure reflect the flow ID evolution path. However, this complicates the implementation of the Reorder Block 321. Instead, a lightweight mechanism is provided to distinguish flows after the initial flow ID determination. Each context can increment a next-flow ID count under software control (step 409). This incrementing is reported to the Reorder Block 321 which maintains it and ensures that zones depend on other earlier zones with the same flow ID if their next-flow ID counts are the same or smaller (step 411). If the packet is ready to retire, i.e., the packet has completed processing and is at the head of its queue (step 413), the context is retired (415). Otherwise a new flow ID is calculated and the process is repeated (steps 407-413).

Example Packet Flow

Figure 5:
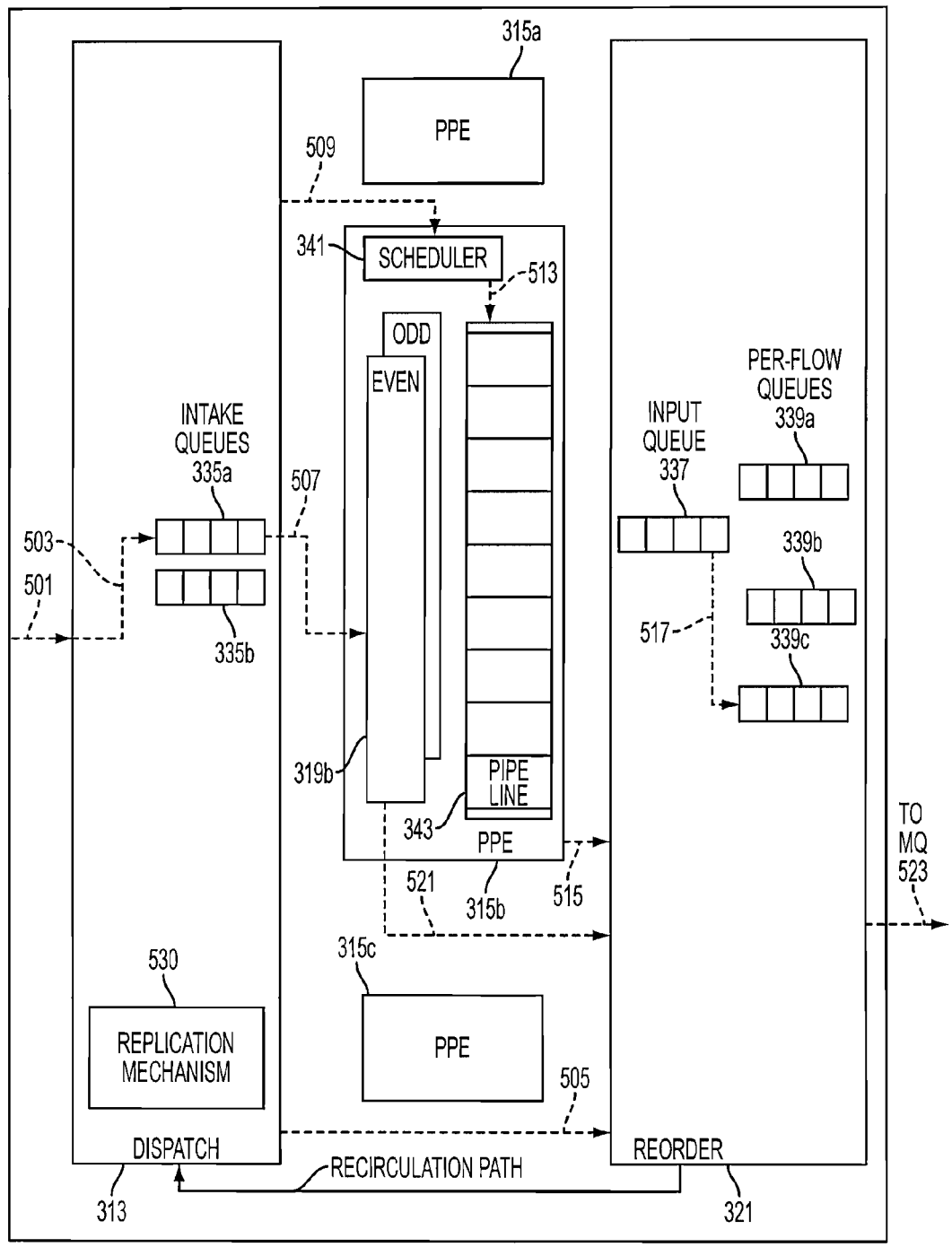
FIG. 5 illustrates a typical packet flow in a lookup unit consistent with the present invention.

FIG. 5 illustrates the typical packet flow between the three blocks described so far. This diagram shows details of the Dispatch Block 313 and the Reorder Block 321, with the pool of PPEs 315a-c in the middle. The Dispatch Block 313 includes two intake queues 335a-b per PPE-half, as incoming packets from the MQ 255 are directed to odd or even zones within each PPE 315a-c. The Reorder Block has a separate queuing structure for each input stream; each structure has a common input queue 337, which splits into per-flow queues 339a-c, and a packet is sent to the MQ after it reaches the head of the per-flow queue. The PPE 315b has physical LMem 319b that is split between odd and even zones, that can be mapped to odd and even contexts.

In FIG. 5, numbered arrows correspond to the numbered steps which will now be described. The packet from the MQ 255 is received by the Dispatch Block 313 (step 501). The Dispatch Block 313 identifies an inactive PPE and zone for this packet, and puts it in the appropriate queue (step 503). In this example, PPE 315b, an even zone was selected, and the packet was inserted in the PPE even-zone queue. The Dispatch Block 313 informs the Reorder Block 321 of the PPE-zone assignment, and the Reorder Block 321 puts it in the appropriate input queue for that input stream (step 505). The Dispatch Block 313 writes the packet into the selected PPE's LMem 319b zone (step 507). (The writes go over the crossbar blocks with an explicit acknowledgement that also goes over the crossbar blocks, but this detail is not shown in the figure.) The Dispatch Block 313 signals scheduler 341 in PPE 315b that a new packet has been written to a particular zone (step 509). The scheduler 341 finds an unused context and maps the newly activated zone to that context and activates the context. The PPE scheduler 341 selects the unused context for execution in a pipeline 343 in any even cycles (step 513). The thread reports the flow ID hash for the packet from the pipeline 343, which is issued to the Reorder Block 313 (step 515). If the packet is at the head of the input queue 337, the Reorder Block 321 moves it to the appropriate per-flow queue based on the hash value; otherwise the movement is delayed until the packet reaches the head of the input queue 337 (step 517). The thread continues execution, completes processing for the packet, indicates to the Reorder Block 321 that the outgoing packet is ready to be sent from its LMem 319b, and terminates the context. This context can now be used for other incoming packets, by binding it to newly activated zones. When the terminated PPE-zone reaches head of the per-flow queue, the Reorder Block 321 unloads it from LMem (step 521). (The read requests go over the crossbar blocks, with explicit read replies that also go over the crossbar blocks, but this detail is not shown in the figure.) After the unloading is complete, the Reorder Block 321 indicates that the zone is retired to the Dispatch Block 313. This zone can now be used for other incoming packets by the Dispatch block 313. The Reorder Block 321 then sends the unloaded packet to the MQ 255 (FIG. 3) (step 523).

The Recirculate Path and Multicasting

Egress multicast packets can have very high replication factors. Because of this high replication factor, processing all copies of an egress multicast packet in a single thread would be a severe performance bottleneck. To avoid this, egress multicast is handled as a two-stage process. The first stage thread will recirculate the packet through the Reorder Block 321 and back to the Dispatch Block 313. The Dispatch Block 313 will replicate the packet and send the specified number of copies to PPE zones. In FIG. 5, a "recirculation path" is graphically illustrated from Reorder Block 321 to Dispatch Block 313. The packet, after being received back at Dispatch Block 313, may be replicated by replication mechanism 530, which may, for instance, make a number of copies of the packet and forward each copy back into intake queues 335. Each copy may then be received and processed by one of PPEs 315 as a "second-stage" thread for the packet. In this way, the copies are received by multiple threads running in parallel. There are two variations on this approach.

Although replication mechanism 530 is shown as part of Dispatch Block 313, in other implementations, replication mechanism 530 could be implemented as part of Reorder Block 321. Additionally, although replication mechanism 530 is described as making "copies" of a packet, in some implementations, LU 245, and hence Dispatch Block 313 and replication mechanism 530 may actually only operate on portions of each packet, such as portions of the header of each received packet. Thus, the "copies" of the packet may only refer to the portions of the packet used by LU 245.

One Issued Packet Per Second-Stage Thread

In this variation, each second stage thread issues only one packet. The disadvantage of this variation is that the overhead of loading the second stage packet is paid by every outgoing multicast packet. The advantage of this variation is that ordering is easily preserved even when changing the multicast list. Each second stage packet should get the same flow ID value. This will cause replicants of an incoming packet to be issued in the order of the multicast list. The Dispatch Block 313 will issue second stage packets from the "current" multicast recirculated packet before issuing any from a subsequent packet. The Reorder Block 321 will ensure that the ordering of packets into the recirculation queue is the same as the arrival order (for packets within a flow).

Multiple Issued Packets Per Second-Stage Thread

In this variation, each second stage thread issues multiple packets. The disadvantage of this variation is that maintaining order when changing the multicast list requires extra work. If a second stage thread remains at the head of its per-flow-queue during the time that it is issuing packets, the processing and unloading of the second-stage threads would be effectively serialized, which would negate the underlying reason for having multiple second-stage threads. This would cause the most problems for high-rate multicast flows. The ordering characteristics of multicast packets provide a way of avoiding this problem. Multicast packets to any particular destination must be kept in order, but multicast packets need not be kept in the order of the multicast list. Thus, the second-stage threads calculate a new hash value for each packet flow. Each entry in the entire multicast replication list may have a unique hash value.

Figure 6:
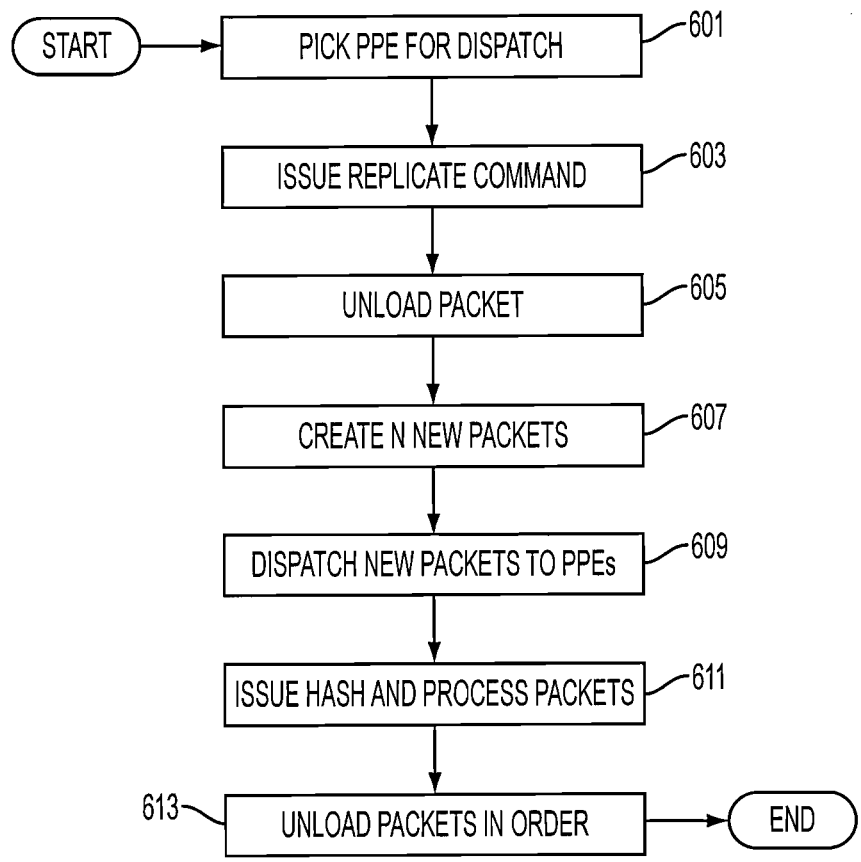
FIG. 6 illustrates a method for packet replication consistent with the present invention.

FIG. 6 illustrates a flow chart of an exemplary packet replication process, along with Table 1. Consider the case where a stream is to be replicated to four ports 1-4. Say the stream includes packet A followed by packet B. The final result should be packet Ai followed by packet Bi for each of the ports i=1-4. Note that there is no ordering requirement between Ai and Bj for i! j. Thus, this parcel sequence below is legal: A1 B1 A2 B2 A4 B4 A3 B3. FIG. 5 and Table 1 are now described, where each row in Table 1 represents one resource within an LU, and time progresses left to right. The assignment of zones to packets is arbitrary; the Dispatch Block 313 picks a random PPE (step 601). Packet A starts in PPE00, reports its reorder hash (i.e., its flow ID), Hm, to the Reorder Block 321 (FIG. 3), determines that the packet needs to be replicated N times, and then issues a replicate command to the Reorder Block (step 603). The Reorder block unloads the packet and hands it to replication mechanism 530 (step 605). After unloading the packet, it also retires the zone to the Dispatch Block 313, which effectively terminates the lifetime of the zone. This concludes the first stage processing for packet A. The replication mechanism 530 creates four new packets, indicated by N in the diagram, which is the second stage processing for packet A (step 607). Each newly created packet, A1-A4, is dispatched to the pool of PPEs—PPE08-11 in this example (step 609). Each packet goes through its typical lifetime, with varying amount of internal processing depending on the required encapsulation and contention with other threads on the same PPE (step 611). Hash values are assigned, wherein the reorder hash includes an instance-number stamped with the packet; H1-H4 denote hash values for packets A1-A4, respectively. Packet B goes through similar processing, starting at PPE04 for the first stage, and PPE12-15 for the second stage. Note that since A and B are in the same flow, the hash values for B1-B4 will also be H1-H4. The unloading of Ai and Bj from the second stage is done by the Reorder Block 321 such that ordering between packets with the same hash value (flow ID) is maintained, as illustrated in the last row of Table 1 (step 613).

TABLE 1

| RESOURCE:PKT | Time |
|---|---|
| PPE00-zone0:A | S Hm---R-T |
| PPE04-zone0:B | S-Hm---R---T |
| Replicate-assist | NNNN-NNNN |
| PPE08-zone0:A1 | S-H1----R-T |
| PPE09-zone0:A2 | S-H2-----R-T |
| PPE10-zone0:A3 | S-H3----------------R-T |
| PPE11-zone0:A4 | S-H4-----------R-T |
| PPE12-zone0:B1 | S-H1----R-T |
| PPE13-zone0:B2 | S-H2------R-T |
| PPE14-zone0:B3 | S-H3----R----------T |
| PPE15-zone0:B4 | S-H4----R------T |
| Reorder Block->MQ A1A2 B1B2A4B4A3B3 | |

Legend for lifetime of each thread above:
S Start of processing in the zone
Hi Reorder Hash with value i
- Other processing
R Reorder Send
T End of processing in the zone While there has been illustrated and described embodiments consistent with the present invention, it will be understood by those skilled in the art that various changes and modifications may be made and equivalents may be substituted for elements thereof without departing from the true scope of the invention. Therefore, it is intended that this invention not be limited to any particular embodiment disclosed, but that the invention will include all embodiments falling within the scope of the appended claims.

We claim:

1. A system comprising:
   a network device to:
   receive, at a first component of the network device, a stream of packets;
   identify, by the first component, a processor, of a plurality of processors, that is inactive,
      the processor including a plurality of blocks of memory;
   identify, by the first component, a block of memory, of the plurality of blocks of memory, that is available;
   send, by the first component and to a second component, information associated with the block of memory;
   store, by the second component, the information associated with the block of memory in a queue;
   store, by the first component, a packet, of the received stream of packets, in the block of memory;
   send, by the processor and to the second component, information associated with the packet;
   process, by the processor, the stored packet;
   send, by the processor and to the second component, an indication that the stored packet has been processed;
   retrieve, by the second component, the processed packet when the information associated with the block of memory is at a head of the queue;
   determine, based on the information associated with the packet, whether the processed packet is to be replicated;
   output, by the second component, the processed packet when the processed packet is not to be replicated;
   return, by the second component, the processed packet to the first component when the processed packet is to be replicated;
   replicate, by the first component, the returned packet to create a plurality of replicated packets, the plurality of replicated packets being identical;
   concurrently process, by two or more processors of the plurality of processors, a first plurality of replicated packets, of the plurality of replicated packets,
      the first plurality of replicated packets having different destinations from one another;
   serially process, by one or more processors of the plurality of processors, a second plurality of replicated packets, of the plurality of replicated packets,
      the second plurality of replicated packets having a same destination; and
   output, by the second component, the processed first plurality of replicated packets and the processed second plurality of replicated packets.

2. The system of claim 1, where the network device is to maintain an order of the stream of packets in packet flows.

3. The system of claim 2, where the network device is to maintain the order using the plurality of queues,
   each of the plurality of queues having a flow ID corresponding to a flow ID of one of the packet flows.

4. The system of claim 2, where the network device is to calculate the flow ID by calculating a hash value of a source address and destination address of a packet in a packet flow.

5. The network device of claim 3, where packets, of the stream of packets, with a same destination have identical flow IDs.

6. The system of claim 1, where the network device includes a router.

7. The system of claim 6, where the first component maintains an incoming packet queue for each of a plurality of ports in the router.

8. The system of claim 1, where the network device is to process a replicated packet before processing a new incoming packet.

9. A method comprising:
receiving a packet at a first component of a network device;
identifying, by the first component, a processor, of a plurality of processors, that is inactive,
the processor including a plurality of blocks of memory;
identifying, by the first component, a block memory, of the plurality of blocks of memory, that is available;
sending, by the first component and to a second component of the network device, information associated with the block of memory;
storing, by the second component, the information associated with the block of memory in a queue;
storing, by the first component, the packet in the block of memory;
sending, by the processor and to the second component, information associated with the packet;
processing, by the processor, the packet;
sending, by the processor and to the second component, an indication that the stored packet has been processed;
retrieving, by the second component, the processed packet when the information associated with the block of memory is at a head of the queue;
determining, based on the information associated with the packet, whether the packet is to be replicated;
outputting, by the second component, the packet when the packet is not to be replicated;
returning, by the second component, the packet to the first component interface when the packet is to be replicated;
replicating, by the first component, the returned packet to create a plurality of replicated packets,
the plurality of replicated packets being identical;
concurrently processing, by two or more processors of the plurality of processors, a first plurality of replicated packets, of the plurality of replicated packets,
the first plurality of replicated packets having different destinations from one another;
serially processing, by one or more processors of the plurality of processors, a second plurality of replicated packets, of the plurality of replicated packets,
the second plurality of replicated packets having a same destination; and
outputting, by the second component, the processed first plurality of replicated packets and the processed second plurality of replicated packets.

10. The method of claim 9, further comprising:
assigning a flow ID to each of the plurality of replicated packets; and
outputting the processed first plurality of replicated packets and the processed second plurality of replicated packets based on the assigned flow ID.

11. The method of claim 10, where assigning the flow ID includes calculating a hash value of a source address and a destination address of each of the plurality of replicated packets.

12. The method of claim 11, where concurrently processing the plurality of replicated packets includes processing the plurality of replicated packets that include a same flow ID.

13. The method of claim 10, further comprising maintaining a particular queue, associated with the second component, for each particular assigned flow ID.

14. The method of claim 13, where returning the packet to the interface includes returning the packet to the first component via the second component.

15. The method of claim 9, where determining whether the packet is to be replicated includes:
examining information in a header of the packet; and
determining whether the packet should be replicated based on the examined information.

16. The method of claim 9, further including receiving a multicast list with the packet.

17. The method of claim 16, further including determining destination addresses for replicated packets using the multicast list.

18. A non-transitory computer-readable medium storing instructions, the instructions comprising:
one or more instructions, which, when executed by processing logic, cause the processing logic to:
receive a packet at a first component;
identify, by the first component, a processor, of a plurality of processors, that is inactive,
the processor including a plurality of blocks of memory;
identify, by the first component, a block memory, of the plurality of blocks of memory, that is available;
send, by the first component and to a second component, information associated with the block of memory;
store, by the second component, the information associated with the block of memory in a queue;
store, by the first component, the received packet in the block of memory;
process, by the processor, the stored packet;
send, by the processor and to the second component, an indication that the stored packet has been processed;
retrieve, by the second component, the processed packet when the information associated with the block of memory is at a head of the queue;
determine, based on the information associated with the packet, whether the processed packet is to be replicated;
output, by the second component, the processed packet when the packet is not to be replicated;
return, by the second component, the processed packet to the first component when the processed packet is to be replicated;
replicate, by the first component, the returned packet to create a plurality of replicated packets;
store a plurality of replicated packets in a plurality of queues associated with the processor,
the plurality of replicated packets being identical;
concurrently process, by two or more processors of the plurality of processors, a first plurality of replicated packets, of the plurality of replicated packets,
the first plurality of replicated packets having different destinations from one another;
serially process, by one or more processors of the plurality of processors, a second plurality of replicated packets, of the plurality of replicated packets,
the second plurality of replicated packets having a same destination; and output, by the second component, the processed first plurality of replicated packets and the processed second plurality of replicated packets.

19. The non-transitory computer-readable medium of claim 18, where the instructions further comprise:
one or more instructions that cause the processing logic to:
assign a flow ID to each of the plurality of replicated packets; and
output the processed first plurality of replicated packets and the processed second plurality of replicated packets based on the assigned flow ID.

20. The non-transitory computer-readable medium of claim 19, where the one or more instructions that cause the processing logic to assign the flow ID include:
one or more instructions that cause the processing logic to:
calculate a hash value of a source address and a destination address of each of the plurality of replicated packets, and
assign the flow ID based on the hash value.

* * * * *